No. 711,874. Patented Oct. 21, 1902.
J. L. MAYFIELD.
FLOAT VALVE.
Application filed Apr. 16, 1902.
(No Model.)
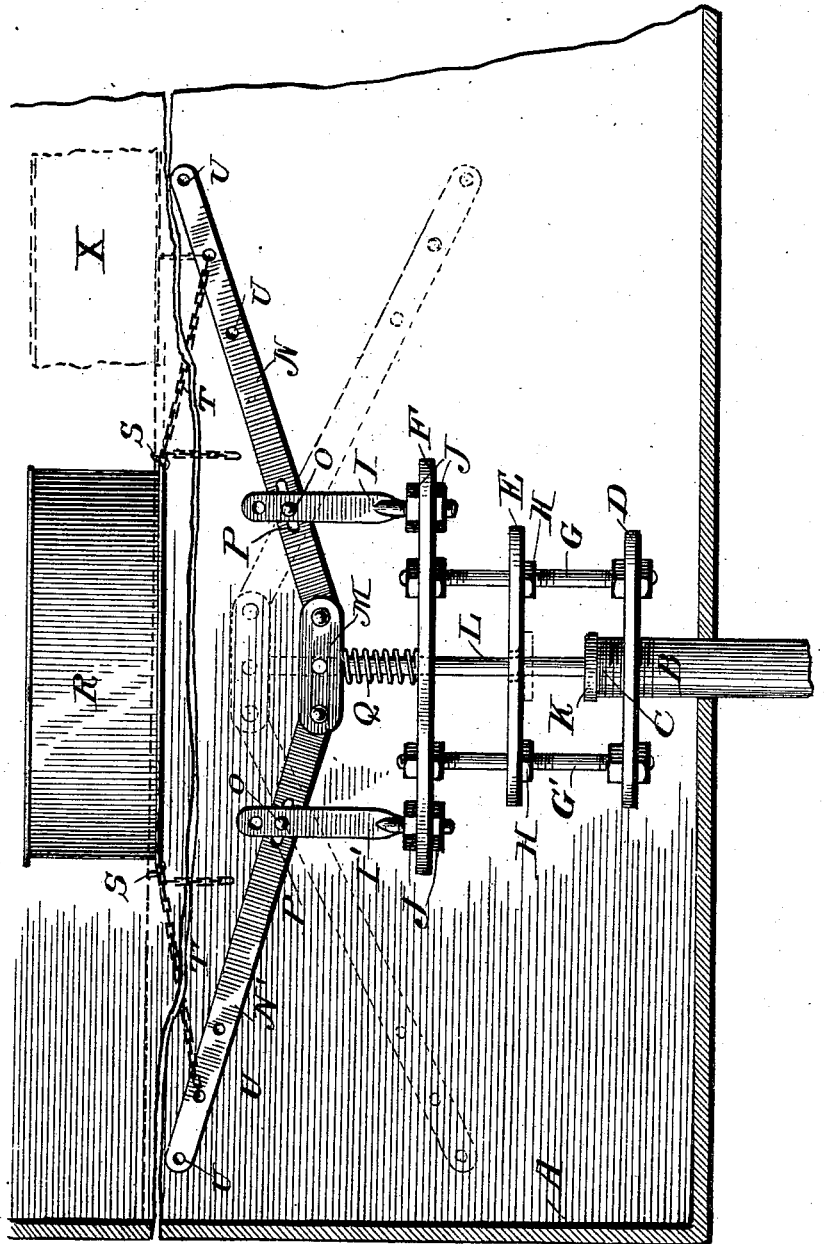
WITNESSES:
Jos. A. Ryan
Harrison B Brown
INVENTOR
Jess Lewis Mayfield
BY Munn & Co.
ATTORNEYS

UNITED STATES PATENT OFFICE.

JESS LEWIS MAYFIELD, OF SONORA, TEXAS.

FLOAT-VALVE.

SPECIFICATION forming part of Letters Patent No. 711,874, dated October 21, 1902.

Application filed April 16, 1902. Serial No. 103,180. (No model.)

*To all whom it may concern:*

Be it known that I, JESS LEWIS MAYFIELD, a citizen of the United States, and a resident of Sonora, in the county of Sutton and State of Texas, have invented certain new and useful Improvements in Float-Valves, of which the following is a specification.

My invention relates to float-valves specially designed for troughs in which it is desirable to maintain a constant level or quantity of water.

The invention consists in an improved valve of the character stated such as will automatically operate to resupply the tank with water when it is withdrawn to a certain lower level and also operate to cut off the inflow when the water shall have reached a certain predetermined height in the trough, such as will be in easy reach of animals for drinking purposes or the maintaining of a desired quantity of stored water.

In order to enable others to make and use my invention, I will now proceed to describe it in detail, reference being had to the annexed drawing, which forms a part of this specification.

In illustrating my invention I show a trough in vertical section having arranged within it my peculiar valve, the supply being shown cut off in full lines and dotted to open or resupply position. The view also shows a modified arrangement of the float, as at X, in dotted lines.

In the drawing, A indicates a trough or tank of any desired conformation adapted to contain and hold stored water.

B represents the end of a feed-pipe leading from any source of supply, having its extreme end provided with a brass valve-seat C.

D represents a base plate or bar having threaded support on the end B of the feed-pipe.

E represents a cross-bar, and F a peculiar top plate.

G G' indicate rods passing loosely through suitable holes in the bars or plates D E F. The rods G G' are screw-threaded and have arranged thereon nuts H above and below the said bars or plates D E F, as shown, for supporting and holding them in fixed position, which obviously can be done by screwing an upper and lower nut tightly against the member to be supported, and thus with all the nuts in tight position it is apparent that a rigid framework is provided such as will effectively support on the end of the feed-pipe the whole valve structure described farther on in detail.

The top plate F is extended beyond the lower plates or bars, and its ends outside of the supporting-rods G G' are provided with suitable holes, through which pass the lower or threaded ends of vertical standards I I', which are secured by nuts J, arranged on their lower or threaded ends above and below the plate F, as shown.

K indicates a disk forming the valve proper or a head adapted to close the open end of the feed-pipe when in contact with the seat C.

L indicates a valve-stem passing loosely through holes in the cross-bar E and top plate F and having swiveled connection with a link or bar M in a way allowing free rotation thereof with the valve K, whereby even wear on the seat C is insured, all as is well understood.

N N' indicate levers having their inner ends pivoted to the bar M and fulcrumed by a pin O to the standard I I', with the said pins passing through elongated slots P, as shown. The outer ends of the levers N N' beyond the pins O may be of weight adapted when unsupported by the floats to lift the valve K; but, if desired, such action can be assisted by a spring Q, arranged on the valve-stem L between the top plate F and the link or bar M.

R indicates a suitable float having at opposite sides hooks S for engagement with the links of chains T, extending from either of a series of perforations U in the levers N N'.

Now with all the parts assembled, as shown in the drawing, it is apparent that when water is withdrawn from the tank the float R will follow the water-level and that in its downward movement the chains T will ease up on the levers N N', allowing them, through the connecting devices and with or without assistance from the spring Q, to lift the valve K from its seat C, when a fresh supply of water will pass into the trough or tank from the feed-pipe B until the original water-level in the trough is restored.

In some instances it may be desirable or necessary to dispense with one of the levers N or N', and when such lever arrangement becomes necessary the float should be connected with the lever employed, as indicated at X in dotted lines.

Having thus fully described my invention, what I claim as new, and desire to secure by Letters Patent, is—

The combination in a float-valve, a vertical stem having at its lower end a head adapted when seated, to close the water-inlet, a rigid and fixed frame providing support for the valve, and guides for the said stem, standards projecting from the said rigid and fixed frame, levers pivoted to the said standards, slots in the said levers, at their pivotal supports, allowing endwise movement thereof on their pivots, a link loosely connecting the inner ends of the said levers and also the upper end of the vertical stem, a spring arranged on the vertical stem between the said connecting-link and the upper side of the rigid and fixed supporting-frame exerting pressure against closure of the water-inlet, and a float having flexible and adjustable connection with the outer or free end of the said levers, substantially as described.

JESS LEWIS MAYFIELD.

Witnesses:
JAMES CORNELL,
E. S. BRIANT.